(12) United States Patent
Fong et al.

(10) Patent No.: US 6,280,063 B1
(45) Date of Patent: *Aug. 28, 2001

(54) BRIGHTNESS ENHANCEMENT ARTICLE

(75) Inventors: Bettie C. Fong, Woodbury; Wade D. Kretman; Keith M. Kotchick, both of St. Paul; Sanford Cobb, Jr., St. Mary's Point; Richard A. Miller, Stillwater; Todd R. Williams, Lake Elmo, all of MN (US); Kazuhiko Toyooka, Yamagata (JP)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/853,261

(22) Filed: May 9, 1997

(51) Int. Cl.[7] ............................................... F21V 5/02
(52) U.S. Cl. .................. 362/333; 362/330; 362/339; 359/456; 359/599; 349/64; 349/112
(58) Field of Search .................. 349/57, 62–65, 349/112; 359/599, 837, 452–457, 460; 362/278, 330–333, 336, 337, 339, 26, 31, 268

(56) References Cited

U.S. PATENT DOCUMENTS

| | | | |
|---|---|---|---|
| 1,491,830 | 4/1924 | Troeger | 359/454 |
| 2,207,835 | 7/1940 | Sukumlyn | 359/454 |
| 2,480,031 | 8/1949 | Kellogg | 359/457 |
| 2,499,453 | 3/1950 | Bonnet | 359/625 |
| 2,551,954 * | 5/1951 | Lehman | 362/333 |
| 2,660,927 | 12/1953 | Burton | 359/459 |
| 2,818,500 | 12/1957 | Franck | 362/337 |
| 3,213,751 | 10/1965 | Benjamin et al. | 359/592 |
| 3,288,990 * | 11/1966 | Stahlhut | 362/331 |
| 4,053,208 | 10/1977 | Kato et al. | 359/460 |
| 4,206,969 | 6/1980 | Cobb et al. | 359/452 |
| 4,379,617 | 4/1983 | Funakoshi et al. | 359/453 |
| 4,418,986 * | 12/1983 | Yata et al. | 359/456 |
| 4,431,720 | 2/1984 | Sugarman | 430/17 |
| 4,509,822 * | 4/1985 | Clausen et al. | 359/456 |
| 4,573,764 * | 3/1986 | Bradley | 359/456 |
| 4,605,283 | 8/1986 | Stanton | 359/453 |
| 4,730,897 | 3/1988 | McKechnie et al. | 359/452 |
| 4,804,253 | 2/1989 | Stewart | 349/104 |
| 4,906,070 | 3/1990 | Cobb, Jr. | 359/834 |
| 5,005,945 | 4/1991 | Van de Ven | 359/456 |
| 5,056,892 | 10/1991 | Cobb, Jr. | 359/831 |
| 5,121,252 * | 6/1992 | Okada et al. | 359/455 |

(List continued on next page.)

FOREIGN PATENT DOCUMENTS

| | | |
|---|---|---|
| 42 32 977 | 10/1992 | (DE) . |
| 0 556 606 | 8/1993 | (EP) . |
| 0 770 902 | 5/1997 | (EP) . |
| 1-161328 | 6/1989 | (JP) . |

OTHER PUBLICATIONS

"Polarized Backlight for Liquid Crystal Display", IBM Technical Disclosure Bulletin, vol. 33, No. 1B, Jun., 1990.

Primary Examiner—Alan Cariaso
(74) Attorney, Agent, or Firm—Stephen W. Buckingham

(57) ABSTRACT

A brightness enhancement article that includes: (a) a transparent, flexible substrate; (b) a first major surface having an array of prisms with blunted or rounded peaks characterized by a chord width, cross-sectional pitch width, and radius of curvature in which the chord width is equal to about 20–40% of the cross-sectional pitch width and the radius of curvature is equal to about 20–50% of the cross-sectional pitch width; and (c) a second major surface characterized by a plurality of light scattering protrusions. The article has a haze value between about 20–60% and a transmission value no greater than about 94% when measured under conditions in which the first surface has a substantially planar topography.

20 Claims, 1 Drawing Sheet

U.S. PATENT DOCUMENTS

| | | | |
|---|---|---|---|
| 5,289,351 * | 2/1994 | Kashima et al. | 362/333 |
| 5,317,409 | 5/1994 | Macocs | 348/751 |
| 5,361,163 | 11/1994 | Matsuda et al. | 359/452 |
| 5,394,255 | 2/1995 | Yokota et al. | 349/64 |
| 5,428,476 | 6/1995 | Jensen et al. | 359/457 |
| 5,552,907 | 9/1996 | Yokota et al. | 349/62 |
| 5,598,280 | 1/1997 | Nishio et al. | 349/57 |
| 5,600,455 | 2/1997 | Ishikawa et al. | 349/57 |
| 5,600,462 | 2/1997 | Suzuki et al. | 349/112 |
| 5,607,764 | 3/1997 | Konno et al. | 428/327 |
| 5,629,784 * | 5/1997 | Abileah et al. | 349/65 |
| 5,706,134 | 1/1998 | Konno et al. | 359/599 |
| 5,714,247 | 2/1998 | Kuo et al. | 428/323 |
| 5,716,681 * | 2/1998 | Williams | 349/64 |
| 5,723,937 | 3/1998 | Whitman et al. | 313/116 |
| 5,757,544 * | 5/1998 | Tabata et al. | 359/599 |

* cited by examiner

BRIGHTNESS ENHANCEMENT ARTICLE

BACKGROUND OF THE INVENTION

This invention relates to enhancing the on-axis luminance (referred to here as "brightness") of a diffuse lighting device.

Displays used in devices such as computers feature a material such as a liquid crystal composition and a light source for back-lighting the material. Films disposed between the back light and the display have been used to enhance the brightness of the display by controlling the exit angles of light.

SUMMARY OF THE INVENTION

In general, the invention features a brightness enhancement article that includes: (a) a transparent, flexible substrate; (b) a first major surface that includes an array of linear prisms having blunted or rounded peaks; and (c) a second major surface characterized by a plurality of light scattering protrusions. These protrusions imbue the surface with a matte appearance. The peaks are characterized by a chord width, cross-sectional pitch width, and radius of curvature in which the chord width is equal to about 20–40% of the cross-sectional pitch width and the radius of curvature is equal to about 20–50% of the cross-sectional pitch width. The article has a haze value between about 20–60% and a transmission value no greater than about 94% when measured under conditions in which the first surface has a substantially planar topography.

The prisms are preferably characterized by a root angle ranging from about 70° to about 110°, more preferably from about 85° to about 95°. Root angles of about 90° are particularly preferred.

In one preferred embodiment, the second major surface is integral with the substrate (e.g., the protrusions may be in the form of "bumps" made of the substrate material). In another preferred embodiment, the second major surface is defined by a layer that includes a resin provided on the substrate. Where the second major surface is defined by a separate resin layer, the protrusions may be in the form of particles dispersed in the resin layer, or may be integral with the resin layer itself (e.g., they may be in the form of "bumps" made of the resin).

In one preferred embodiment, the first major surface of the article is integral with the substrate. In such embodiments, the haze and transmission values are measured by applying a material such as an index-matching oil to the first major surface to fill in the "valleys" between the blunted or rounded peaks to render the surface substantially planar.

In another preferred embodiment, the first major surface is defined by a separate layer that includes a resin provided with the above-described prisms. In such embodiments, the haze and transmission values are measured on the article prior to application of this resin layer.

The invention also features a method of enhancing the brightness of a uniform, diffusely-emitting, lighting device that includes placing the above-described brightness enhancement article substantially parallel to a light-emitting surface of the device. The invention further features a uniform, diffusely-emitting, lighting device that includes the above-described brightness enhancement article. Examples of preferred devices include back-lit displays such as back-lit liquid crystal displays.

The invention provides a brightness enhancement article having a matte appearance that exhibits good gain, wide viewing angles in both horizontal and vertical planes, soft cut-off, and good abrasion resistance. The matte appearance also helps mask cosmetic imperfections in the article, as well as the device with which the article is used, such as scratches, white spots, and stains which may arise during manufacture or installation.

Other features and advantages of the invention will be apparent from the following description of the preferred embodiments thereof, and from the claims.

DESCRIPTION OF THE PREFERRED EMBODIMENTS

Figure 1:
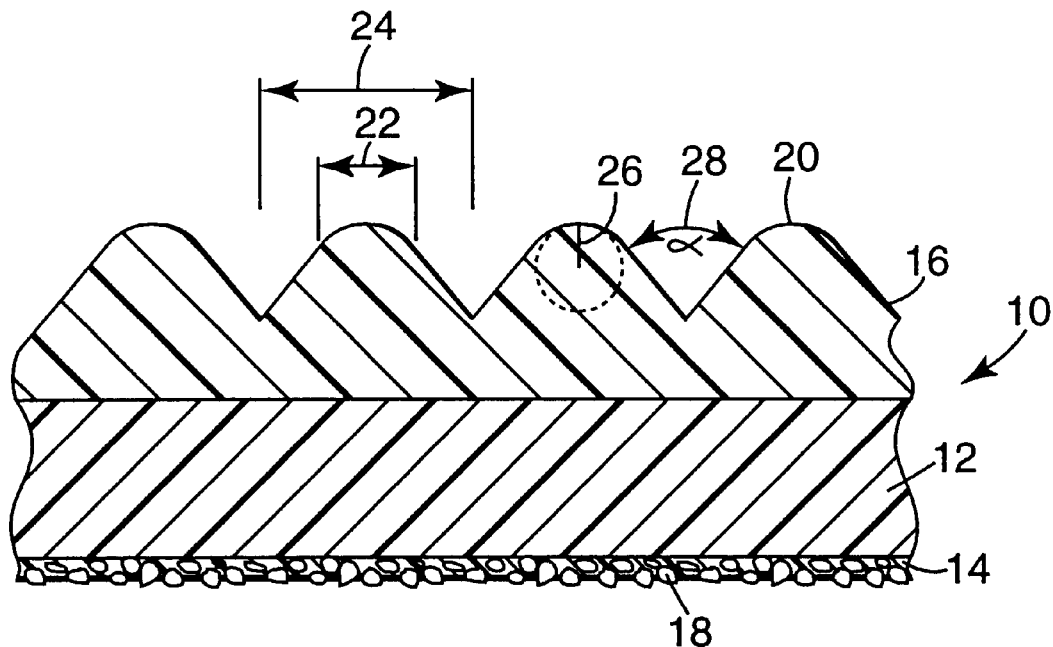
FIG. 1 is a cross-sectional view of a multi-layer brightness enhancement article.

The brightness enhancement article features a flexible, transparent base layer and two distinct surfaces, each having a topography designed to act in concert to perform the function of controlling the exit angles of light emitted from a back-lit display where the article is placed substantially parallel to a light-emitting surface of the article. The article may take several forms. Referring to FIG. 1, there is shown a multi-layer brightness enhancement article 10. Article 10 includes a flexible, transparent base layer 12 provided with two separate layers 14, 16 on opposite surfaces of layer 12.

Layer 12 is typically a thin, flexible, polymeric layer made of a material such as polyethylene terephthalate, polymethyl methacrylate, or polycarbonate. The thickness of layer 12 preferably is in the range of about 25 to about 500 microns.

The thickness of layer 14 preferably is in the range of about 1 to about 50 microns. The purpose of layer 14 is to provide a light-diffusing surface. To this end, layer 14 includes a plurality of elements 18 protruding from the surface of layer 14. As shown in FIG. 1, these elements are preferably particles dispersed in a polymeric resin. Examples of suitable particles include silica, alumina, calcium carbonate, and glass and plastic beads. The elements may also be in the form of "bumps" formed from the resin itself or from a different material and deposited on the surface of layer 14; an example of the former is commercially available from A.G. Bayer of Germany under the trade designation "Makrofol."

The size, size distribution, and loading of elements 18 are selected to provide a matte surface with light-diffusing ability, as indicated by the haze and percent transmission of article 10 measured in the absence of layer 16 according to ASTM D-1003-95 using a Haze-Gard Plus haze meter commercially available from Byk-Gardner of Silver Spring, Md. Preferably, the haze is between about 20–60% and the percent transmission is not greater than about 94%.

Articles featuring a flexible, transparent base layer provided with a layer of resin having a series of particles protruding from its surface are commercially available from Tekra, Inc., New Berlin, Wis., under the designation "Marnot™ Matte Melinex® Film" and "Marnot™ XL Matte Lexan® Film." In particular, the Marnot™ Matte Melinex® Film in grades 55 GU, 35 GU, and 20 GU have been found to be suitable.

The thickness of layer 16 preferably is in the range of about 10 to about 75 microns. Layer 16 acts in concert with layer 14 to control the angles at which the light is emitted.

Layer 16 is preferably a layer of polymer resin provided with a topography designed to achieve this purpose. Suitable resins include the u.v.-polymerized products of acrylate and/or methacrylate monomers. One particularly preferred resin is the u.v.-polymerized product of a brominated, alkyl-substituted phenyl acrylate or methacrylate (e.g., 4,6-dibromo-2-sec-butyl phenyl acrylate), a methyl styrene monomer, a brominated epoxy diacrylate, 2-phenoxyethyl acrylate, and a hexa-functional aromatic urethane acrylate oligomer, as described in Fong et al., U.S. Ser. No. 08/853, 995, entitled "Chemical Composition and Polymers and Polymeric Material Derived Therefrom," filed concurrently herewith, which is assigned to the same assignee as the present application and incorporated herein by reference.

The topography of layer 16 is characterized by an array of linear prisms having blunted or rounded peaks 20 characterized by a chord width 22, cross-sectional pitch width 24, radius of curvature 26, and root angle 28 in which the chord width is equal to about 20–40% of the cross-sectional pitch width and the radius of curvature is equal to about 20–50% of the cross-sectional pitch width. The root angle ranges from about 70–110°, preferably from about 85–95°, with root angles of about 90° being particularly preferred. The placement of the prisms within the array is selected to maximize the desired optical performance. To this end, for example, the prisms may be arranged to form a plurality of alternating zones having peaks that are spaced at different distances from an arbitrarily selected, common reference plane, as described in Wortman et al., U.S. Ser. No. 08/832, 132, filed Apr. 3, 1997 now U.S. Pat. No. 5,771,328 entitled "Light Directing Film Having Variable Height Structured Surface and Light Directing Article Constructed Therefrom," which is assigned to the same assignee as the present application and hereby incorporated by reference. To reduce the visibility of moire interference patterns, adjacent groups of peaks may be characterized by different pitch widths, as described in Cobb et al., U.S. Ser. No. 08/631, 073, filed Apr. 12, 1996 entitled "Variable Pitch Structured Optical Film," which is assigned to the same assignee as the present application and hereby incorporated by reference.

The topography is preferably imparted onto the surface of the resin according to the processes described in Lu et al., U.S. Pat. No. 5,175,030 and Lu, U.S. Pat. No. 5,183,597. Specifically, the resin composition is contacted with a master bearing a negative of the desired topography. The resin composition is then cured, e.g., by exposure to ultraviolet radiation, while in contact with the master to impart the desired topography to the resin surface.

Figure 2:
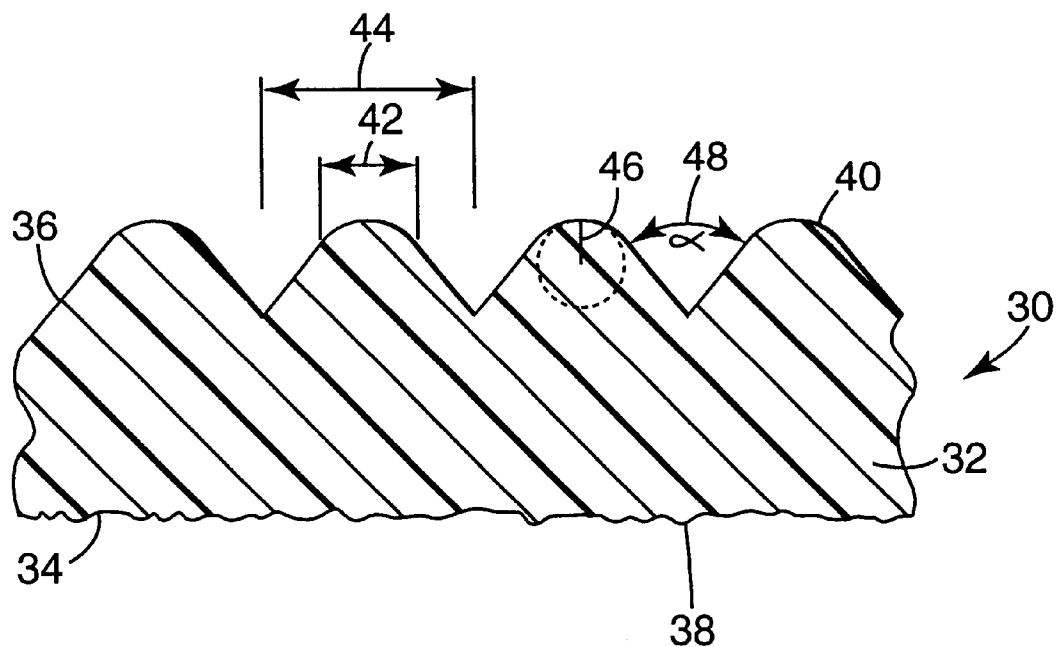
FIG. 2 is a cross-sectional view of a monolithic brightness enhancement article.

The brightness enhancement article may also be in the form of a monolithic article, as shown in FIG. 2. Specifically, brightness enhancement article 30 features a flexible, base layer 32 having a pair of opposed surfaces 34, 36, both of which are integrally formed with base layer 32. Suitable materials for layer 32 are the same as those described above in the case of layer 12 of multi-layer article 10.

Surface 34 features a series of protruding light-diffusing elements 38. These elements may be in the form of "bumps" in the surface made of the same material as layer 32.

Surface 36 features an array of linear prisms having blunted or rounded peaks 40 integrally formed with base layer 32. As in the case of article 10, these peaks are characterized by a chord width 42, cross-sectional pitch width 44, radius of curvature 46, and root angle 48 in which the chord width is equal to about 20–40% of the cross-sectional pitch width and the radius of curvature is equal to about 20–50% of the cross-sectional pitch width. The root angle ranges from about 70–110°, preferably from about 85–95°, with root angles of about 90° being particularly preferred. As in the case of article 10, the placement of the prisms within the array is selected to maximize the desired optical performance.

The particular method used to create the topography characterizing surface 36 is not critical. One useful molding process is described in Benson et al., U.S. Ser. No. 08/472, 444, filed Jun. 7, 1995, now U.S. Pat. No. 5,691,846 entitled "Ultra-Flexible Retroreflective Cube Corner Composite Sheetings and Methods of Manufacture," which is assigned to the same assignee as the present application and hereby incorporated by reference.

In the case of an article such as article 30, in which the surface bearing the prisms is integral with the base layer, the haze and transmission values are measured by applying a material such as an index-matching oil to the peak-bearing surface to fill in the "valleys" between the blunted or rounded peaks and thereby render the surface substantially planar. Suitable oils have a refractive index substantially equal to the refractive index of the surface. The haze and transmission measurements are then made in accordance with ASTM D-1003-95 using the Haze-Gard Plus haze meter.

The invention will now be described further by way of the following examples. All amounts are given in weight percent unless otherwise noted.

EXAMPLES

Example 1

A photopolymerizable resin was prepared combining a brominated epoxy acrylate (available from UCB-Radcure of Smyrna, Ga. under the designation "RDX 51027") (52 parts) and 2-phenoxy-ethyl acrylate (available from Henkel Corp., Ambler, Pa., under the designation "Photomer 4035") (9 parts), and heating at 100° C. to soften the brominated epoxy acrylate, after which the two components were mixed until fluid. Next, methyl styrene (available from Monomer-Polymer & Dajac Laboratories, Inc., Feasterville, Pa. as a 70:30 mixture of meta- and para-isomers) (11 parts) and 4,6-dibromo-2-sec-butyl phenyl acrylate (prepared as described in Olson, U.S. Ser. No. 08/853,981, entitled "High Index of Refraction Monomer," filed concurrently herewith, which is assigned to the same assignee as the present application and hereby incorporated by reference) (25 parts) were blended into the fluid mixture, followed by a hexa-functional aromatic urethane acrylate oligomer (available from UCB-Radcure of Smyrna, Ga. under the designation "EB-220") (3 parts). A nonionic fluorosurfactant ("FC-430" available from Minnesota Mining & Manufacturing Co., of St. Paul, Minn.) (0.3) and photoinitiator (2,4,6-trimethylbenzoyldiphenylphosphine oxide available from BASF of Charlotte, N.C. under the designation "Lucirin TPO") (3) were then added and mixed together for at least 15 minutes, after which the mixture was heated in an oven at 60–70° C. for 30 to 60 minutes.

The resulting composition was spread on the smooth side of a Tekra Marnot™ XL Matte Melinex® 55 GU film (available from Tekra Corp., New serlin, Wis.) using a knife coater to yield a resin coating having a thickness of 25 microns. The coated film was then placed in contact with a master bearing a micro-fine prismatic pattern. Next, the master and film were heated to 130° F., and then passed under an ultraviolet lamp (300 watts/in$^2$) at a speed of 20–25 ft/min. to cure the resin and simultaneously replicate the prismatic pattern of the master on the resin surface. Following cure, the coated film was separated from the master to yield a product having a surface characterized as follows:
chord width: 16.8 microns
radius: 14.8 microns
root angle: 90 degree
pitch: 50 microns
chord width/pitch: 33.6%

"Gain" refers to the ratio of the brightness of a backlit display equipped with a brightness enhancing film to the brightness of the display in the absence of the film. The "viewing angle" is the angle at which the on-axis brightness drops by 50%. It is measured in both the horizontal plane (i.e., in a plane parallel to the long axis of the prisms forming one surface of the brightness enhancement film) and the vertical plane (i.e., in a plane perpendicular to the long axis of the prisms).

The gain and viewing angles of the film were measured using an Eldim EZ Contrast Conoscopic Measurement Device (available from Eldim Co. of Caen, France) equipped with a Sharp STN backlight model C12P (available from Sharp Co. of Tokyo, Japan) as the backlighting source. The Conoscopic Measurement Device provides a plot of gain versus viewing angle in both the vertical and horizontal planes. The maximum slope of the curve provides a measure of the "softness" of the brightness cut-off, with smaller slopes being desirable. The results are as follows:
Gain: 1.30
View Angle (Vertical): 37.00
View Angle (Horizontal): 51.90
Max. Slope (Vertical): 0.0576 gain/°
Max. Slope (Horizontal): 0.0612 gain/°

Example 2

A film was prepared according to Example 1 except that the film was a Tekra Marnot™ XL Matte Melinex® 20 GU film. Following cure, the film was separated from the master to yield a product having a surface characterized as follows:
chord width: 10.4 microns
radius: 10.5 microns
root angle: 90 degree
pitch: 50 microns
chord width/pitch: 20.8%

The gain, viewing angles, and maximum slope of the gain versus viewing angle plot were determined as described above. The results are as follows:
Gain: 1.28
View Angle (Vertical): 37.4°
View Angle (Horizontal): 53.2°
Max. Slope (Vertical): 0.0495 gain/°
Max. Slope (Horizontal): 0.0584 gain/°

Other embodiments are within the following claims.

For example, the article may feature a base in which the blunted or rounded peaks are integrally formed with the base and the matte surface is provided in the form of a separate resin layer on the base. Alternatively, the matte surface may be integrally formed with the base and the peak-bearing surface provided in the form of a resin layer.

The brightness enhancement article may be combined with one or more additional brightness enhancement articles. Such additional articles may be the same or different from the original article. For example, the article may be combined with a second brightness enhancement article having prisms terminating in pointed peaks, rather than a rounded or blunt peaks.

What is claimed is:

1. A brightness enhancement article comprising:
   (a) a transparent, flexible substrate;
   (b) a first major surface comprising an array of linear prisms having blunted or rounded peaks characterized by a chord width, cross-sectional pitch width, and radius of curvature in which the chord width is equal to about 20–40% of the cross-sectional pitch width and the radius of curvature is equal to about 20–50% of the cross-sectional pitch width; and
   (c) a second major surface characterized by a plurality of light scattering protrusions,
   said article having a haze value between about 20–60% and a transmission value no greater than about 94% when measured under conditions in which said first surface has a substantially planar topography.

2. A brightness enhancement article according to claim 1 wherein said prisms are characterized by a root angle ranging from about 70° to about 110°.

3. A brightness enhancement article according to claim 1 wherein said prisms are characterized by a root angle ranging from about 85° to about 95°.

4. A brightness enhancement article according to claim 1 wherein said prisms are characterized by a root angle of about 90°.

5. A brightness enhancement article according to claim 1 wherein said second major surface is integral with said substrate.

6. A brightness enhancement article according to claim 1 wherein said second major surface is defined by a layer comprising a resin provided on said substrate.

7. A brightness enhancement article according to claim 6 wherein said light scattering protrusions comprise particles dispersed in said resin.

8. A brightness enhancement article according to claim 6 wherein said light scattering protrusions are integral with said resin layer.

9. A brightness enhancement article according to claim 1 wherein said first major surface is integral with said substrate.

10. A brightness enhancement article according to claim 1 wherein said first major surface is defined by a layer comprising a resin provided with said prisms.

11. A brightness enhancement article comprising:
    (a) a transparent, flexible substrate;
    (b) a first major surface defined by a layer comprising a resin provided on said substrate,
    said first major surface comprising an array of prisms having blunted or rounded peaks characterized by a chord width, cross-sectional pitch width, and radius of curvature in which the chord width is equal to about 20–40% of the cross-sectional pitch width and the radius of curvature is equal to about 20–50% of the cross-sectional pitch width; and
    (c) a second major surface defined by a layer comprising a resin provided on said substrate,
    said second major surface comprising a plurality of light scattering protrusions,
    said article having a haze value between about 20–60% and a transmission value no greater than about 94% when measured under conditions in which said first surface has a substantially planar topography.

12. A brightness enhancement article according to claim 11 wherein said prisms are characterized by a root angle ranging from about 70° to about 110°.

13. A brightness enhancement article according to claim 11 wherein said prisms are characterized by a root angle ranging from about 85° to about 95°.

14. A brightness enhancement article according to claim 11 wherein said prisms are characterized by a root angle of about 90°.

15. A method of enhancing the brightness of a uniform, diffusely-emitting, lighting device having a light-emitting surface, said method comprising placing a brightness enhancement article substantially parallel to said light-emitting surface, said article comprising:

(a) a transparent, flexible substrate;

(b) a first major surface comprising an array of prisms having blunted or rounded peaks, said peaks being characterized by a chord width, cross-sectional pitch width, and radius of curvature in which the chord width is equal to about 20–40% of the cross-sectional pitch width and the radius of curvature is equal to about 20–50% of the cross-sectional pitch width; and (c) a second major surface characterized by a plurality of light scattering protrusions, said article having a haze value between about 20–60% and a transmission value no greater than about 94% when measured under conditions in which said first surface has a substantially planar topography.

16. A method according to claim 15 comprising placing said brightness enhancement article substantially parallel to the light-emitting surface of a back-lit display device.

17. A method according to claim 15 comprising placing said brightness enhancement article substantially parallel to the light-emitting surface of a back-lit liquid crystal display device.

18. A device comprising:

(a) a uniform, diffusely-emitting, lighting device having a light-emitting surface; and (b) a brightness enhancement article placed substantially parallel to said light-emitting surface, said brightness enhancement article comprising:

(i) a transparent, flexible substrate;

(ii) a first major surface comprising an array of prisms having blunted or rounded peaks characterized by a chord width, cross-sectional pitch width, and radius of curvature in which the chord width is equal to about 20–40% of the cross-sectional pitch width and the radius of curvature is equal to about 20–50% of the cross-sectional pitch width; and (iii) a second major surface characterized by a plurality of light scattering protrusions, said article having a haze value between about 20–60% and a transmission value no greater than about 94% when measured under conditions in which said first surface has a substantially planar topography.

19. A device according to claim 18 wherein said lighting device is in the form of a back-lit display device.

20. A device according to claim 18 wherein said lighting device is in the form of a back-lit liquid crystal display device.

* * * * *

UNITED STATES PATENT AND TRADEMARK OFFICE
CERTIFICATE OF CORRECTION

PATENT NO. : 6,280,063 B1
DATED : August 28, 2001
INVENTOR(S) : Fong, Bettie C.

It is certified that error appears in the above-identified patent and that said Letters Patent is hereby corrected as shown below:

<u>Title page,</u>
FOREIGN PATENT DOCUMENTS, the following reference should be added:
-- H9-113902   5/1997  (JP) --;

<u>Column 5,</u>
Line 31, "37.00" should read -- 37.0° --; and
Line 32, "51.90" should read -- 51.9° --.

Signed and Sealed this

Third Day of September, 2002

Attest:

Attesting Officer

JAMES E. ROGAN
*Director of the United States Patent and Trademark Office*